Patented Feb. 2, 1937

2,069,210

UNITED STATES PATENT OFFICE 2,069,210

FLAVANTHRONE DYESTUFF AND PRINTING PASTE

George M. Bishop, Buffalo, N. Y., assignor to National Aniline & Chemical Company, Inc., New York, N. Y., a corporation of New York No Drawing. Original application November 7, 1929, Serial No. 405,532. Divided and this application February 21, 1936, Serial No. 65,065

10 Claims. (Cl. 8—6)

The present invention relates to dyestuff and printing pastes of vat dyestuffs, more particularly flavanthrone dyestuffs, as well as to processes for the production and application thereof. The invention also includes textile material printed with said printing pastes.

In printing with flavanthrone dyestuffs on textile fibers in accordance with the process ordinarily employed, the dyestuff is applied to the fiber as a printing paste containing the unreduced color in a dispersed state, a reducing agent, an alkali, a thickener, and other ingredients employed as assistants in the operation. Since the unreduced dyestuff has little or no affinity for the fiber, the prints are subjected to a steaming operation wherein the dyestuff is reduced to the leuco-form, in which condition it penetrates the fiber. To fix the color in or on the fiber, the prints are exposed to the air, or other oxidizing agent, whereby the leuco-dyestuff is oxidized to the original insoluble dyestuff. The prints are then washed and soaped, well rinsed, and dried.

The printing paste is usually prepared by mixing a paste of the dyestuff, or mixture with other dyestuffs, with the other necessary ingredients, namely, reducing agent, alkali, thickener, etc. Owing to the wide variety of printing formulas used by various dyers and printers, the printing pastes are generally prepared at the place of use and are not placed on the market as such. The flavanthrone dyestuffs are generally placed on the market in the form of aqueous pastes or water suspensions of the insoluble dyestuff in a dispersed condition, with or without other ingredients such as thinning agents, dispersing agents, etc.

The dyeing of textiles by printing is generally accomplished under considerable difficulties. The dyestuff pastes, as they ordinarily appear on the market, tend to dry out after the container is opened, even when precautions are taken to prevent evaporation of water therefrom. The drying out of the dyestuff pastes in storage results in the production of lumps in the paste which are not readily dispersed when the printing paste is made therefrom. The presence of lumps in the printing paste results in specky prints, and is therefore highly objectionable.

The present invention has for one of its objects the production of a dyestuff paste of a flavanthrone dyestuff in which the dyestuff is highly dispersed and which, when made into a printing paste, yields uniform prints free from speckiness.

A further object is the production of a dyestuff paste or printing paste of a flavanthrone dyestuff in which the dyestuff is readily reducible by the common reducing agents used in printing. A further object is to secure sharply outlined prints, a better penetration of the leuco dyestuff into the fiber, and a more complete utilization of the dyestuff. Still another object is the production of a flavanthrone dyestuff paste which is relatively stable and which does not dry out or readily form lumps on exposure to the air. These and other objects, as will be apparent from a consideration of the specification, are accomplished in the practice of the invention.

According to the present invention, a dyestuff paste is formed by incorporating with a flavanthrone dyestuff in the presence of a dispersing agent and such other ingredients as are normally employed in making dye pastes, an assistant which comprises a hydroxyalkyl ether, particularly a di-(hydroxyalkyl) ether, and more especially a di-(hydroxyalkyl) mono-ether; for example, diethylene glycol ($HO.CH_2.CH_2.O.CH_2.CH_2.OH$), dipropylene glycol $$(HO.CH_2.CH_2.CH_2.O.CH_2.CH_2.CH_2.OH),$$

dibutylene glycol ($HO.(CH_2)_4.O.(CH_2)_4.OH$), etc. Prints made from printing pastes in which the above assistants are employed are conspicuous for the brightness of the shade, strength, and penetration of the color, absence of specks in the printed portion, and clearness of outline and even distribution of color in the design. I have further found that the dyestuff pastes of the present invention are not only valuable compositions by reason of the advantageous action of the hydroxyalkyl ethers as printing assistants, but they also have advantageous properties in themselves. Thus, said dyestuff pastes do not dry out upon standing in the open air. The composition of such pastes, when exposed to the air, will vary only with the relative humidity of the air, and accordingly they may be permitted to stand in open containers without formation of an insoluble rim or crust, such as forms when ordinary vat dyestuff pastes are permitted to stand for any considerable time exposed to the atmosphere. This feature is of commercial importance in connection with the maintenance and storage of stocks of the dyestuff pastes. In addition, the pastes of the present invention do not freeze at ordinary winter atmospheric temperatures, and accordingly can be shipped without special precautions.

The invention will be exemplified in the following examples. The parts are by weight.

*Example 1. Dyestuff paste.*—To 400 parts of a flavanthrone aqueous paste (Color Index No.

1118) containing about 25% solids, 1.2 parts of Leukanol (as a dispersing agent), the liquid phase being essentially water, there are added 240 parts of diethylene glycol (beta-beta'-dihydroxy-diethyl-ether). The mixture is evaporated with constant agitation to a weight of about 400 parts. A dye paste is thus obtained which contains together with the dyestuff, approximately 1 part of water to 4 parts of diethylene glycol. The water originally present in the paste has been in major part replaced by the diethylene glycol.

The resulting paste does not dry out upon standing. Comparative tests with it and an ordinary aqueous paste composed of flavanthrone, dispersing agent and water, showed that upon exposure to the air for 18 days, the ordinary paste lost 76.3 per cent. of its original weight, while the paste of the above example lost only 7.1 per cent of its original weight. Further, the new paste will not freeze at any temperature encountered in winter weather.

*Example 2. Printing paste.*—20 parts of the flavanthrone dyestuff paste prepared by the procedure set forth in above Example 1 are mixed with 20 parts of British gum powder and 61 parts of water. 17 parts of potassium carbonate are added and the mixture is heated at about 170° F. until the potassium carbonate and gum are dissolved. The mixture is then cooled to about 140° F. at which temperature 10 parts of sodium sulfoxylate-formaldehyde are added.

Prints prepared from the resulting printing paste show better penetrations, sharper outline and increased strength and brightness of color over prints made with pastes which do not contain the new assistants. There is also less loss of dyestuff, since a greater portion of the dyestuff in the paste deposited on the fiber is reduced and penetrates the fiber.

The fibers or fabrics upon which the printing pastes of the present invention have been applied, have imprinted thereon, before reduction of the dyestuff to the leuco form by steaming, pastes comprising the vat dyestuff and the hydroxyalkyl ethers, as well as such other assistants as may be employed. In the subsequent operations of washing and soaping, the hydroxyalkyl ether and other assistants are removed.

The improved results secured in accordance with the invention may be due to several factors. It is possible that because of its hygroscopic nature, the presence of the hydroxyalkyl ether in the printed pattern prevents it from excessive drying between the printing operation and the steaming or ageing operation. It is also possible that the hydroxyalkyl ether increases the solubility of the leuco-compound of the dyestuff, and thereby improves its penetration into the fiber and brings about better fixation, resulting in decreased losses of dyestuff during the subsequent operations of washing and soaping. However, I do not wish to be limited by the above theoretical considerations in claiming my invention.

The desirable effects of the presence of hydroxyalkyl ethers in flavanthrone printing pastes vary in degree according to the proportion or amount thereof which is present in the paste. In the above Example 1, I have disclosed a paste containing the preferred proportion of diethylene glycol, namely, about 4 parts diethylene glycol to one part of water, which ordinarily will be found advantageous, but it is to be understood that the proportions may be varied. However, when a paste containing a higher ratio of diethylene glycol is permitted to stand in contact with the air, it absorbs moisture until an equilibrium is reached at which point the paste will contain approximately four parts of diethylene glycol to one part of water. When lower proportions of diethylene glycol are present in the paste, it loses water until the point of equilibrium is reached. It will thus be seen that the water content of the pastes prepared according to the invention reaches a state of equilibrium when the pastes are exposed to the atmosphere, the water content remaining approximately constant after equilibrium has been reached. It is also obvious that the advantages of changed proportions should be balanced against the accompanying disadvantages to meet particular situations.

The amount of flavanthrone dyestuff in the paste may be varied from the compositions above described in order to produce dyeings of different strengths, as is well understood in the art. Also, it will be understood that the invention is not limited with respect to other ingredients which may be used in the pastes along with the diethylene glycol and dyestuff, and that the paste may be compounded in any other convenient manner. The invention, furthermore, comprises fabrics and other materials printed with the dye pastes prepared by the process above set forth.

This application is a division of my application, Serial No. 405,532, filed November 7, 1929, for Dyestuff pastes for use in printing.

I claim:

1. As a composition of matter, a dyestuff paste comprising a flavanthrone dyestuff and a hydroxy alkyl ether.

2. As a composition of matter, a dyestuff paste comprising a flavanthrone dyestuff and a di-(hydroxyalkyl) ether.

3. As a composition of matter, a dyestuff paste comprising a flavanthrone dyestuff in the paste form, a dispersing agent and a hydroxyalkyl ether.

4. As a composition of matter, a dyestuff paste comprising flavanthrone and a di-(hydroxyalkyl) mono-ether.

5. As a composition of matter, a dyestuff paste comprising a flavanthrone dyestuff and diethylene glycol.

6. As a composition of matter, a dyestuff paste comprising flavanthrone in the paste form, a dispersing agent and diethylene glycol.

7. A process of printing textile fibers, which comprises applying to the fiber a printing paste comprising a flavanthrone dyestuff and a hydroxyalkyl ether as a printing assistant.

8. A process of printing textile fibers, which comprises applying to the fiber a printing paste comprising a flavanthrone dyestuff and diethylene glycol as a printing assistant.

9. A process of printing textile fibers, which comprises applying to the fiber a printing paste comprising flavanthrone, a dispersing agent and a di-(hydroxyalkyl) ether.

10. A process of printing textile fibers, which comprises applying to the fiber a printing paste comprising flavanthrone, a dispersing agent and diethylene glycol.

GEORGE M. BISHOP.